US011952811B2

United States Patent

(12) United States Patent
Ide et al.

(10) Patent No.: US 11,952,811 B2
(45) Date of Patent: Apr. 9, 2024

(54) VEHICLE LOCK DEVICE

(71) Applicant: Johnan Manufacturing Inc., Nagano (JP)

(72) Inventors: Naoki Ide, Nagano (JP); Mayu Kobayashi, Nagano (JP)

(73) Assignee: Johnan Manufacturing Inc., Nagano (JP)

( * ) Notice: Subject to any disclaimer, the term of this patent is extended or adjusted under 35 U.S.C. 154(b) by 0 days.

(21) Appl. No.: 17/699,364

(22) Filed: Mar. 21, 2022

(65) Prior Publication Data

US 2022/0307299 A1 Sep. 29, 2022

(30) Foreign Application Priority Data

Mar. 29, 2021 (JP) ................................. 2021-055977

(51) Int. Cl.
*E05B 83/24* (2014.01)

(52) U.S. Cl.
CPC ............ *E05B 83/243* (2013.01); *E05B 83/24* (2013.01)

(58) Field of Classification Search
CPC .......... E05B 83/16; E05B 83/18; E05B 83/24; E05B 83/243; E05B 83/247; E05B 85/20; E05B 85/24; E05B 85/243; E05B 85/26
See application file for complete search history.

(56) References Cited

U.S. PATENT DOCUMENTS 5,150,933 A * 9/1992 Myslicki ................. E05B 83/16 292/216
11,162,276 B2 * 11/2021 Inan ........................ E05B 83/24
11,168,498 B2 * 11/2021 Distefano ............. E05B 85/243
11,214,995 B2 1/2022 Schiffer et al.
2012/0049543 A1 * 3/2012 Park ........................ E05B 83/24 292/220

(Continued)

FOREIGN PATENT DOCUMENTS

CN 108474227 A 8/2018
DE 202012000153 U1 * 4/2012 ............. E05B 83/24

(Continued)

OTHER PUBLICATIONS

Japanese Official Action dated Mar. 7, 2023 from related application JP 2021-055977 together with English language translation.

(Continued)

*Primary Examiner* — Christine M Mills
*Assistant Examiner* — Noah Horowitz
(74) *Attorney, Agent, or Firm* — Scully, Scott, Murphy & Pressser, PC

(57) ABSTRACT

A vehicle lock device includes a base including an entry groove for entry of a striker, a latch that pivots between a restraining position to restrain the striker and a release position to release the striker and also to allow entry of the striker, a locking lever engaging the latch and holding the latch in the restraining position, and a torsion spring that presses the striker rearward in an entry direction when a first arm portion comes into contact with the striker, and that applies an elastic force to the latch toward the release position when the first arm portion engages the latch. The first arm portion of the torsion spring is disengaged from the latch when the first arm portion is pushed down in the entry direction by the striker.

3 Claims, 9 Drawing Sheets

(56) References Cited

U.S. PATENT DOCUMENTS

| | | | | |
|---|---|---|---|---|
| 2015/0345186 | A1* | 12/2015 | Park | E05B 85/26 292/194 |
| 2019/0003217 | A1 | 1/2019 | Schiffer et al. | |
| 2020/0399937 | A1* | 12/2020 | Nelsen | E05B 83/24 |

FOREIGN PATENT DOCUMENTS

| | | | |
|---|---|---|---|
| JP | 2019-505703 | A | 2/2019 |
| JP | 2020-165086 | A | 10/2020 |

OTHER PUBLICATIONS

Chinese Official Action dated Feb. 23, 2024 received from the China National Intellectual Property Administration in related application CN 202210287692.7 together with English language translation.

* cited by examiner

VEHICLE LOCK DEVICE

CROSS-REFERENCE TO RELATED APPLICATION

The present patent application claims the priority of Japanese patent application No. 2021/055977 filed on Mar. 29, 2021, and the entire contents of Japanese patent application No. 2021/055977 are hereby incorporated by reference.

TECHNICAL FIELD

The present invention relates to a vehicle lock device.

BACKGROUND ART

One of known vehicle lock devices (or vehicle hood lock devices) is, e.g., a vehicle lock device in which a torsion spring engages a latch that comes in contact with a striker (see Patent Literature 1). This vehicle lock device includes a latch that rotates between a restraining position to restrain a striker and a release position to release the striker, a locking lever that holds the latch in the restraining position, and a torsion spring that has one end engaging the latch and applies an elastic force to the latch in a direction toward the release position. In this vehicle lock device, engagement between the one end of the torsion spring and the latch allows an elastic force of the torsion spring to push up the striker via the latch at the time of opening the hood and also to press the latch to rotate toward the release position in the hood open state. That is, since one torsion spring can push up the striker and presses the latch to rotate in this vehicle lock device, the number of components of the vehicle lock device can be reduced.

CITATION LIST

Patent Literature

Patent Literature 1: JP 2020/165086 A

SUMMARY OF INVENTION

In the known vehicle lock device described above, sliding resistance is generated at an engagement portion between the latch and the torsion spring (e.g., sliding resistance caused by sliding between a spring hole formed on the latch and one end of the torsion spring connected to the spring hole) when the hood is pushed up by the torsion spring (at the time of opening the hood) or the hood is pushed down against the torsion spring (at the time of closing the hood). Thus, force of pushing up or pushing down the hood is lost by the amount of this sliding resistance (sliding loss occurs).

It is an object of the invention to provide a vehicle lock device which can suppress loss of force of pushing up or pushing down a lid.

According to an aspect of the invention, provided is a vehicle lock device which is configured to lock a lid to open and close an opening of a vehicle into a closed state, the vehicle lock device comprising:

- a base comprising an entry groove for entry of a striker;
- a latch that pivots between a restraining position to restrain the striker and a release position to release the striker and also to allow entry of the striker;
- a locking lever engaging the latch and holding the latch in the restraining position; and
- a torsion spring that presses the striker rearward in an entry direction when a first arm portion comes into contact with the striker, and that applies an elastic force to the latch toward the release position when the first arm portion engages the latch,
- wherein the first arm portion of the torsion spring is disengaged from the latch when the first arm portion is pushed down in the entry direction by the striker.

Advantageous Effects of Invention

According to an aspect of the invention, a vehicle lock device can be provided which can suppress loss of force of pushing up or pushing down a lid.

DESCRIPTION OF EMBODIMENTS

A vehicle lock device in an embodiment of the invention will be described below in reference to the appended drawings. This vehicle lock device is arranged at an opening of an engine compartment provided at the front of a vehicle and locks a hood (bonnet) (lid) opening/closing the opening in such a manner that the hood is locked in a closed state. The vehicle lock device has a locking function to lock the hood in the closed state by restraining a striker fixed to the hood, and a push-up function to push open the hood by pushing the striker up. Particularly, this vehicle lock device has a hood push-up structure which can reduce loss of force of pushing up or pushing down the hood. In the following description, left, right, front, rear, up and down are as defined in each drawing. In particular, an entry direction of the striker is defined as an up-and-down direction, a direction orthogonal to the up-and-down direction is defined as a left-and-right direction, and a direction orthogonal to the up-and-down direction as well as the left-and-right direction is defined as a front-and-rear direction. In the present embodiment, for example, the up-and-down direction of the vehicle lock device coincides with an up-and-down direction of the vehicle, the left-and-right direction of the vehicle lock device coincides with a width direction of the vehicle, and the front-and-rear direction of the vehicle lock device coincides with a front-and-rear direction of the vehicle.

Embodiment

Figure 1A:
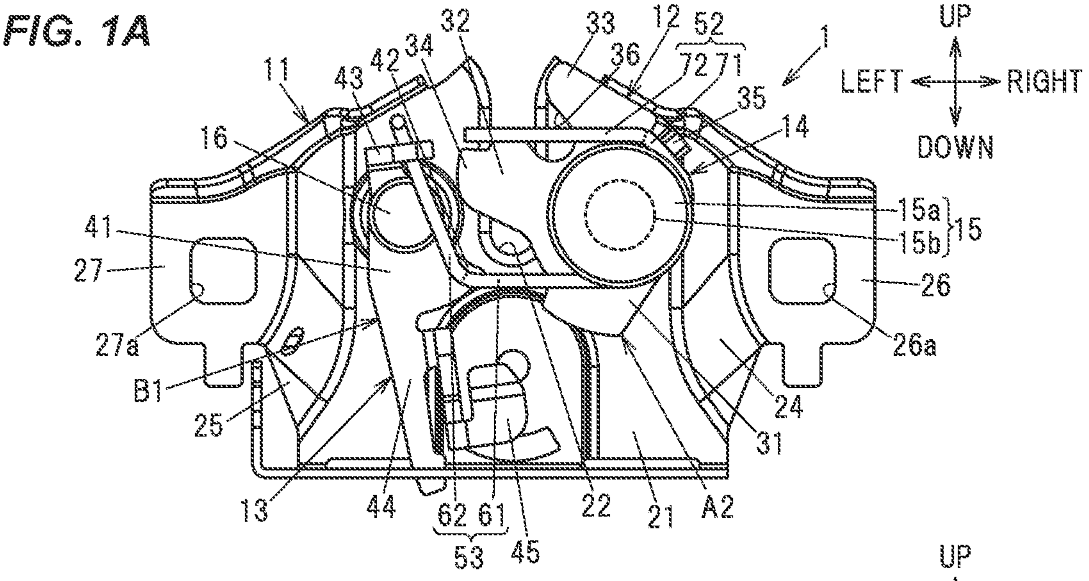
FIG. 1A is a front view showing a vehicle lock device in an embodiment of the present invention when a hood is in an open state.
Figure 1B:
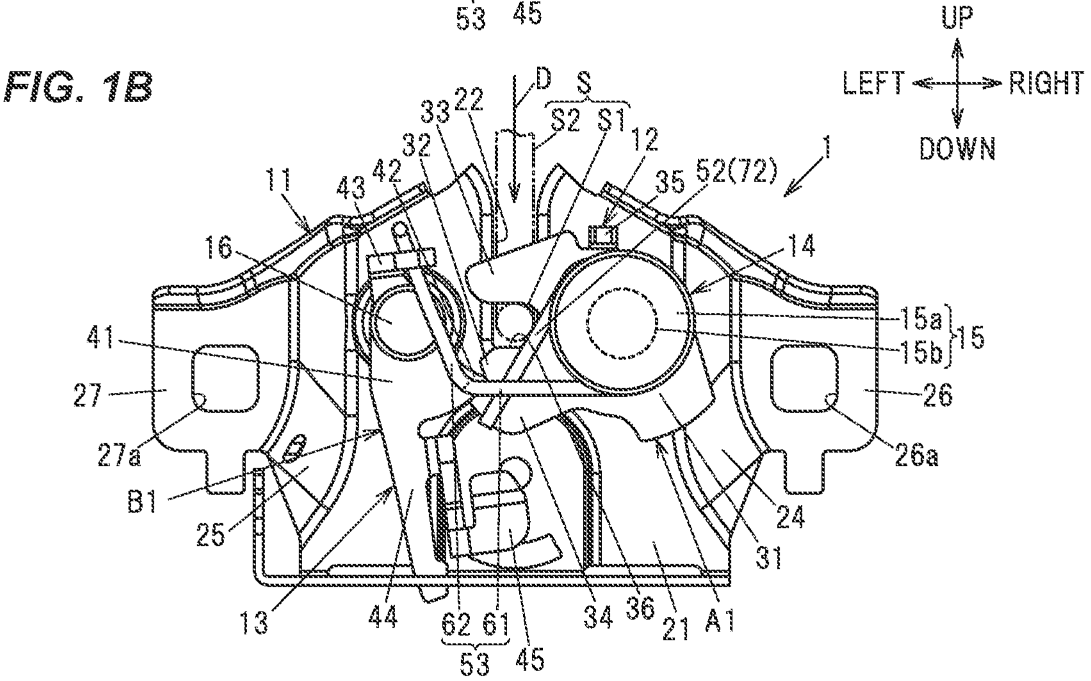
FIG. 1B is a front view when the hood is in a closed state.
Figure 1C:
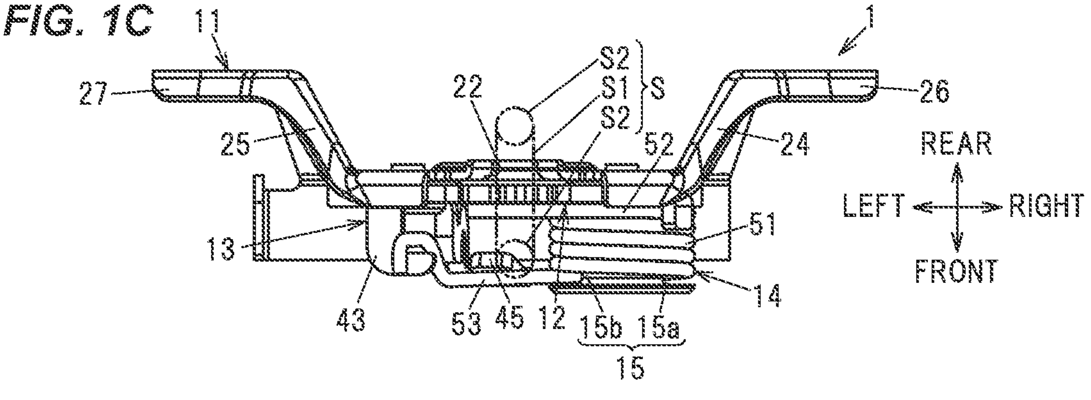
FIG. 1C is a plan view when the hood is in the open state.
Figure 2A:
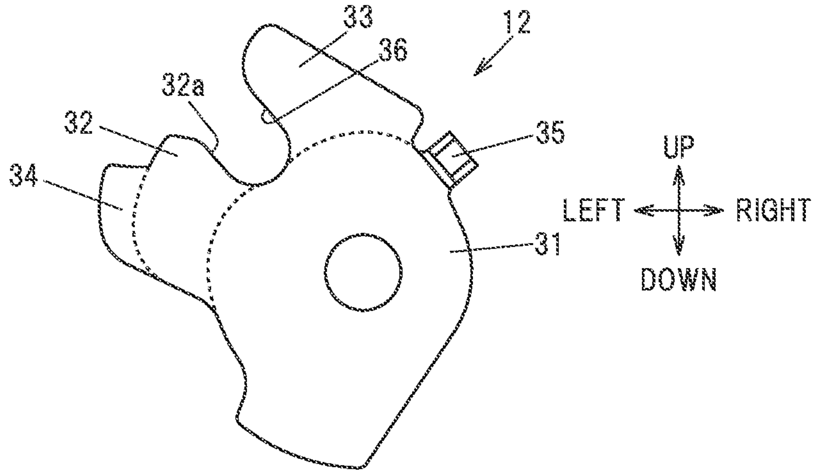
FIG. 2A is a front view showing a latch.
Figure 2B:
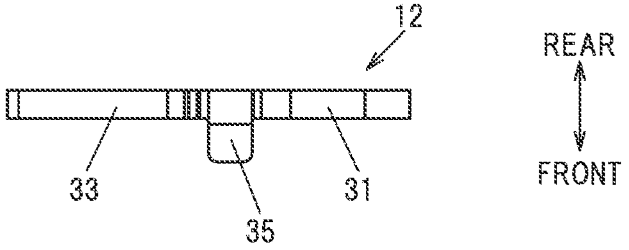
FIG. 2B is a side view when viewed from top right.
Figure 2C:
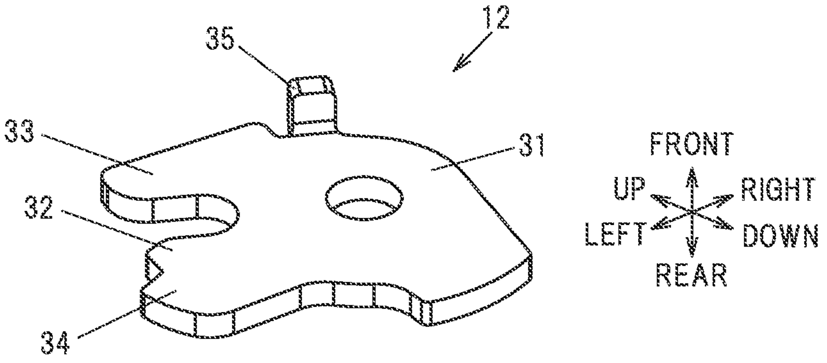
FIG. 2C is a perspective view.
Figure 3A:
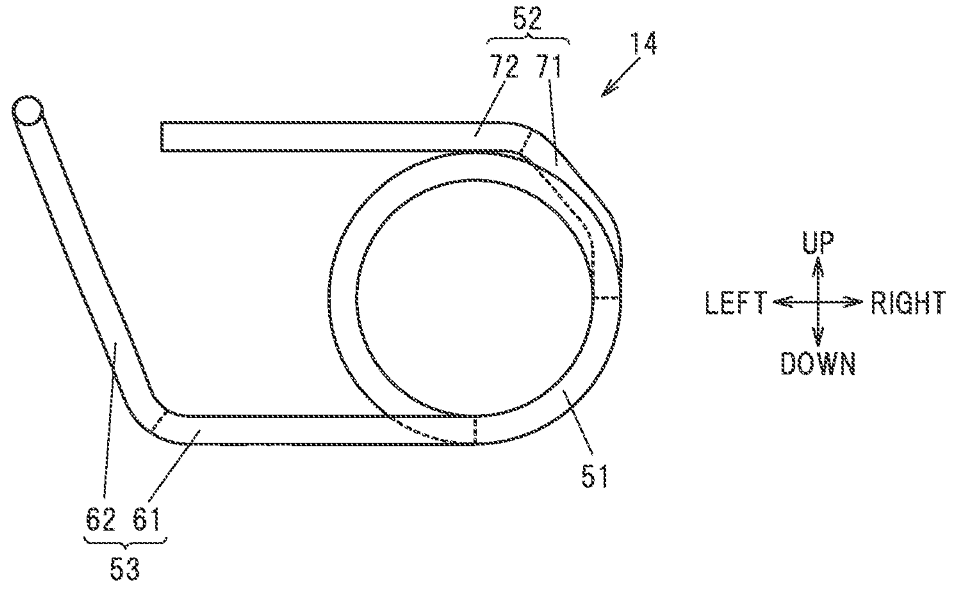
FIG. 3A is a front view showing a torsion spring.
Figure 3B:
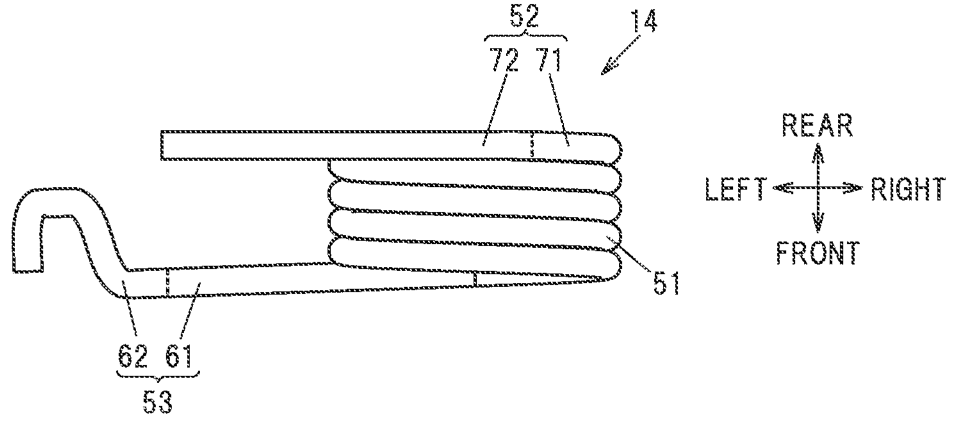
FIG. 3B is a plan view.

As shown in FIGS. 1A-1C, a vehicle lock device 1 includes a base 11 having an entry groove 22 for entry of a striker S, a hook-shaped latch 12 that is pivotably supported on a front surface of the base 11 on the right side and restrains the striker S, a locking lever 13 (pole) pivotably supported on the front surface of the base 11 on the left side to lock the latch 12, and a torsion spring 14 that is arranged adjacent to the latch 12 on the front side and pushes up the striker S rearward in an entry direction D. The latch 12 is supported on the base 11 by a latch pin 15 acting as a pivot axis so as to be able to pivot between a restraining position A1 (see FIG. 1B) to restrain the striker S and a release position A2 (see FIG. 1A) to release the striker S and also to allow entry of the striker S. Meanwhile, the locking lever 13 is supported on the base 11 by a locking pin 16 acting as a pivot axis so as to be able to pivot between a lock position B1 (see FIG. 1B) to lock the latch 12 at the restraining position A1 and an unlock position B2 (see FIG. 6A) to unlock the latch 12.

As shown in FIGS. 1A-1C, the base 11 is formed of a sheet metal and has a flat plate portion 21 having a plate shape, the entry groove 22 formed on the flat plate portion 21 at the middle in the left-and-right direction, a right rising portion 24 and a left rising portion 25 that rise up from left and right edges of the flat plate portion 21 so as to spread from each other toward the rear, a right flange portion 26 extending in the right direction from an end of the right rising portion 24 and having a right attachment hole 26*a*, and a left flange portion 27 extending in the left direction from an end of the left rising portion 25 and having a left attachment hole 27*a*. The base 11 is screwed to the vehicle body at two locations, the right attachment hole 26*a* and the left attachment hole 27*a*.

The entry groove 22 is an opening extending downward from an upper edge of the flat plate portion 21 and is formed as a "U"-shaped groove with an opening on the upper side and a bottom on the lower side in front view. The entry groove 22 has a width wide enough for the striker S to pass through and acts as a striker guide to guide the striker S. The striker S has a columnar engagement portion S1 and a pair of arm portions S2 supporting the columnar engagement portion S1 on both sides, and the entry groove 22 comes into contact with the columnar engagement portion S1 and guides the striker S.

As shown in FIGS. 1A-1C and 2A-2C, the latch 12 is formed of a metal member having a plate shape and a "U"-shape, and integrally has a main body 31 pivotably attached to the latch pin 15, a first claw portion 32 extending in the left direction from the main body 31 so as to cross over the entry groove 22 and coming into contact with the striker S from below, a second claw portion 33 extending in the left direction from the main body 31 so as to face the first claw portion 32 and coming into contact with the columnar engagement portion S1 of the striker S from above, an engagement target claw 34 formed at an end of the first claw portion 32 and configured to be engaged with the locking lever 13, and an engagement target rib 35 (the engagement target portion) formed to rise forward from an upper right edge of the main body 31 and configured to be engaged with the torsion spring 14.

A restraining groove 36 to restrain the striker S is formed between the first claw portion 32 and the second claw portion 33. In the state in which the latch 12 is pivoted and located in the restraining position A1, the restraining groove 36 faces to left. In the state in which the latch 12 is pivoted and located in the release position A2, the open side of the restraining groove 36 faces upward to allow the striker S moving on the entry groove 22 to enter the inside of the restraining groove 36.

The first claw portion 32 has an upper end face 32*a* serving as a contact surface (a receiving surface) coming into contact with the columnar engagement portion S1 of the striker S, and acts as a pressure receiving portion that receives pressure from the striker S moving on the entry groove 22 from above. Meanwhile, the second claw portion 33 has a lower end face serving as a pressing surface to press the columnar engagement portion S1 of the striker S from above, and acts as a pressing portion to restrict the striker S from moving rearward in the entry direction D (see FIG. 1B) and hold the striker S in the state in which the latch 12 is pivoted and located in the restraining position A1.

The engagement target rib 35 is a rib formed to rise from the main body 31 toward the front and comes into contact with and engages a first arm portion 52 of the torsion spring 14 from diagonally right above. The engagement target rib 35 engage the first arm portion 52 from the rear side of a winding direction of the torsion spring 14 (i.e., from a clockwise side in the circumferential direction of the torsion spring 14 in the front view) and transmits a pressing force of the torsion spring 14 to the latch 12. The latch 12 is pressed toward the release position A2 by this pressing force of the torsion spring 14. It can be also described that the engagement target rib 35 comes into contact with and engages the first arm portion 52 at the rear side of the rotation direction of the first arm portion 52 when the striker S pushes down the first arm portion 52. This configuration allows the engagement target rib 35 to be disengaged from the first arm portion 52 when the striker S pushes down the first arm portion 52 in the entry direction D. The details of this configuration will be described later.

As shown in FIGS. 1A-1C, the locking lever 13 is formed of a plate-shaped metal member extending in the up-and-down direction, and integrally has a main body 41 pivotably supported about the locking pin 16 and extending in the up-and-down direction, an engagement claw 42 formed at a lower end of the main body 41 on the right side and configured to engage the engagement target claw 34 of the latch 12, a spring engagement portion 43 formed at an upper end of the main body 41 and engaging a second arm portion 53 of the torsion spring 14, a downward extension portion 44 extending downward from a lower end of the main body 41, and an operation portion 45 formed at a base end of the downward extension portion 44 on the right side and operated by a release cable (not shown).

In the state in which the locking lever 13 is pivoted and located in the lock position B1, the engagement claw 42 engages the engagement target claw 34 of the latch 12 pivoted and located in the restraining position A1, and locks (holds) the latch 12 in the restraining position A1. Meanwhile, in the state in which the locking lever 13 is pivoted and located in the unlock position B2, the engagement target claw 34 is disengaged from the engagement claw 42 and the latch 12 is unlocked. Pivoting from the lock position B1 to the unlock position B2 is performed by operating the operation portion 45 using the release cable. Meanwhile, in the state in which operation by the release cable is not performed, the pressing force of the torsion spring 14 is transmitted to the locking lever 13 via the second arm portion 53 and the locking lever 13 is pivoted and located in the lock position B1. An upper end face of the engagement claw 42 is a guide slope inclined downward to the right. When the latch 12 pivots from the release position A2 to the restraining position A1 in a state in which the locking lever 13 is located in the lock position B1, this guide slope comes into contact with the latch 12 and the locking lever 13 pivots toward the unlock position B2. This allows the latch 12 to pivot to the restraining position A1.

As shown in FIGS. 1A-1C and 3A-3B, the torsion spring 14 is wound on the latch pin 15 and has a coiled portion 51 formed by winding a metal wire, the first arm portion 52 located on the rear side and formed by extending the metal wire from one end of the coiled portion 51, and the second arm portion 53 located on the front side and formed by extending the metal wire from the other end of the coiled portion 51. In particular, the torsion spring 14 is arranged between a head portion **15*a* of the latch pin 15 and the latch 12 with a shaft portion 15*b* of the latch pin 15 inserted therethrough and is arranged adjacently on the front side of the latch 12 so that the first arm portion 52 is located on the latch 12** side.

The second arm portion 53 has a left extension portion 61 extending in the left direction from a lower portion of the coiled portion 51, and a lever engagement portion 62 that is bent from an end of the left extension portion 61, extends diagonally upward to the left and engages the spring engagement portion 43 of the locking lever 13. The torsion spring 14 presses the locking lever 13 toward the lock position B1 through this engagement between the lever engagement portion 62 of the second arm portion 53 and the spring engagement portion 43 of the locking lever 13.

The first arm portion 52 has a latch engagement portion 71 that extends upward from a right portion of the coiled portion 51 and then diagonally upward to the left and engages the engagement target rib 35 of the latch 12, and a striker contact portion 72 that is connected to an end of the latch engagement portion 71, extends to the left over the entry groove 22 and is configured to come into contact with the striker S. The torsion spring 14 applies an elastic force to the latch 12 toward the release position A2 through this engagement between the latch engagement portion 71 of the first arm portion 52 and the engagement target rib 35 of the latch 12. The torsion spring 14 also presses the striker S rearward (upward) in the entry direction D by the striker contact portion 72 of the first arm portion 52 which is in press contact with the columnar engagement portion S1 of the striker S.

The first arm portion 52 is also configured such that when it is pushed down (in the entry direction D of the striker S) by the striker S, the latch engagement portion 71 is disengaged from the engagement target rib 35. That is, in the state in which the first arm portion 52 is pushed down by the striker S, the latch engagement portion 71 is disengaged from the engagement target rib 35, and the torsion spring 14 presses only the striker S, of the striker S and the latch 12. Meanwhile, in the state in which the hood (not shown) is open and the first arm portion 52 is not pushed down by the striker S, the latch engagement portion 71 of the torsion spring 14 engages the engagement target rib 35 and presses the latch 12. That is, the latch engagement portion 71 engages the engagement target rib 35 and presses the latch 12 in the state in which the first arm portion 52 is not pushed down by the striker S, regardless of whether or not the striker S is in contact with the first arm portion 52.

(Operation of the Vehicle Lock Device)

Next, a hood closing operation (a hood closing method) and a hood opening operation (a hood opening method) of the vehicle lock device 1 will be described in reference to FIGS. 4A to 6C. The arm portion S2 of the striker S which is located on the front side of the drawing is omitted in FIGS. 4A to 6C.

Firstly, the hood closing operation of the vehicle lock device 1 will be described in reference to FIGS. 4A-4C and 5A-5B. This hood closing operation is performed by a user dropping a front-end side of the hood from above and is an operation to restrain the striker S of the closed hood by the vehicle lock device 1 and thereby lock (hold) the hood in the closed state. In addition, the hood closing operation is started in the state in which the latch 12 is pivoted and located in the release position A2 by the pressing force of the torsion spring 14 and the locking lever 13 is pivoted and located in the lock position B1. In this regard, in the state before the hood closing operation is performed (in the state in which the latch 12 is at a distance from the striker S), the first arm portion 52 of the torsion spring 14 engages the engagement target rib 35 of the latch 12 and the latch 12 is pressed to the release position A2.

Figure 4A:
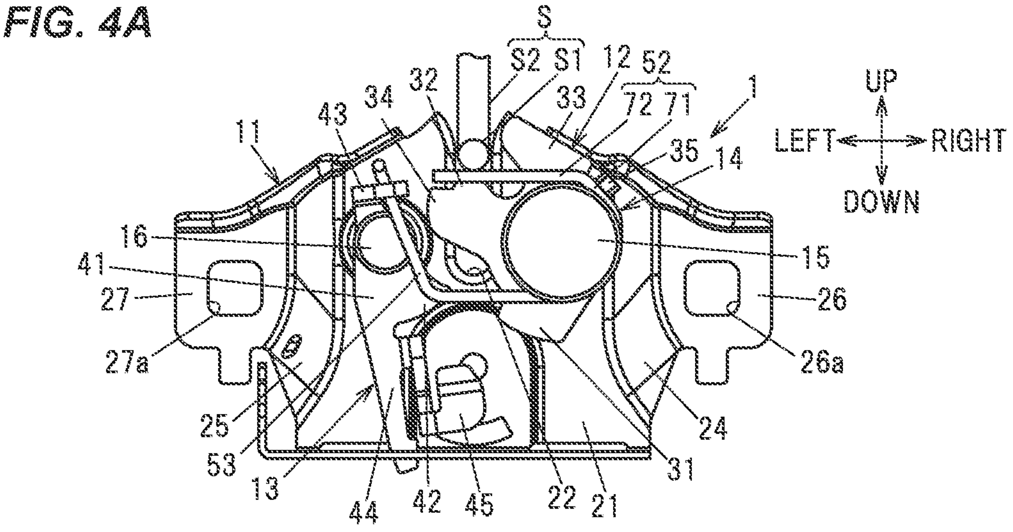
FIGS. 4A-4C are explanatory diagrams showing the first half of a hood closing operation of the vehicle lock device.

As shown in FIG. 4A, when closure of the hood is started by dropping the front side of the hood, the striker S firstly enters the entry groove 22 and the columnar engagement portion S1 of the striker S comes into contact with (the striker contact portion 72 of) the first arm portion 52 of the torsion spring 14. Since the first arm portion 52 of the torsion spring 14 is arranged above the first claw portion 32 of the latch 12, the columnar engagement portion S1 of the striker S firstly comes into contact with the first arm portion 52.

Figure 4B:
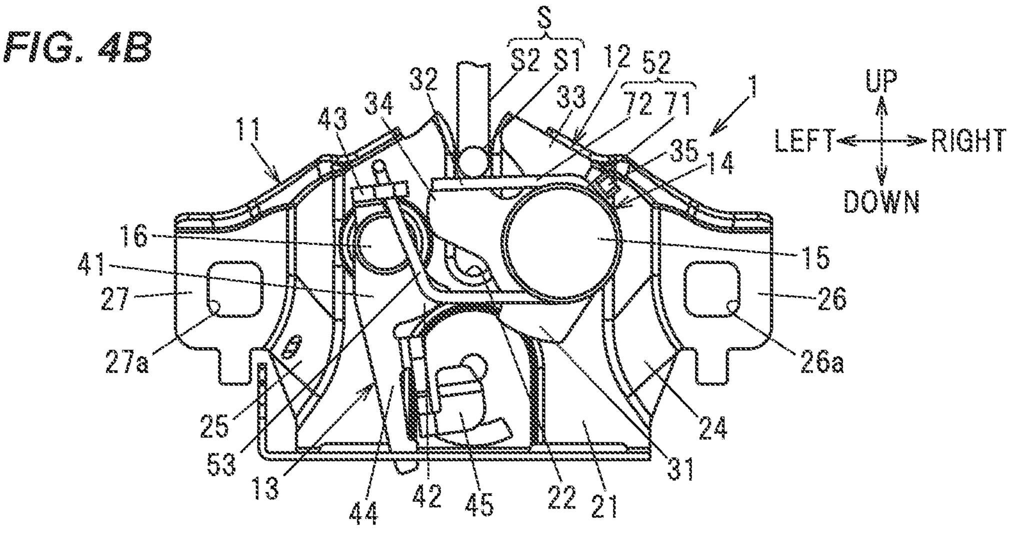

Then, when the closure of the hood proceeds and the striker S advances on the entry groove 22, the first arm portion 52 is pressed down by the striker S and rotates downward and the latch engagement portion 71 of the first arm portion 52 is disengaged from the engagement target rib 35 of the latch 12 by the rotation of the first arm portion 52 as shown in FIG. 4B. After that, the striker S comes into contact with the first claw portion 32 of the latch 12.

Figure 4C:
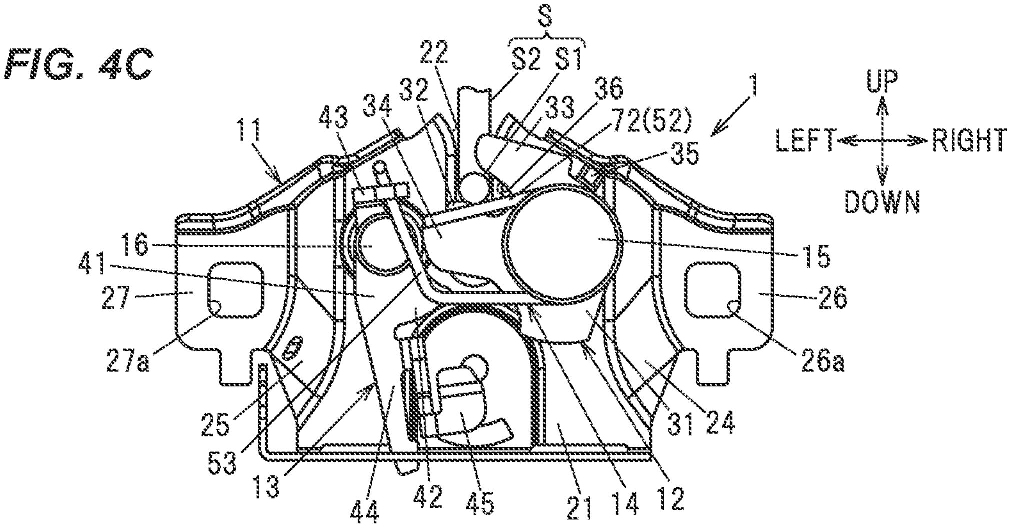
Figure 5A:
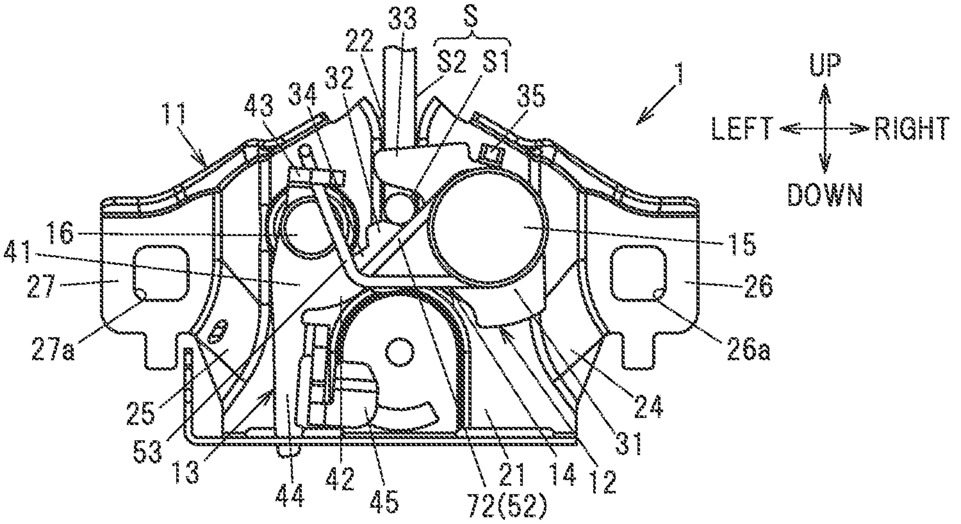
FIGS. 5A-5B are explanatory diagrams showing the second half of the hood closing operation of the vehicle lock device.

Then, when the closure of the hood further proceeds and the striker S continues to advance on the entry groove 22, the first arm portion 52 is more rotated as shown in FIG. 4C and also the latch 12 pivots toward the restraining position A1 by pressure from the striker S. This causes the columnar engagement portion S1 of the striker S to enter the restraining groove 36 of the latch 12. After that, when the closure of the hood further proceeds and the latch 12 reaches the restraining position A1 as shown in FIG. 5A, the engagement target claw 34 of the latch 12 engages the engagement claw 42 of the locking lever 13 and the latch 12 is locked in the restraining position A1. The latch 12 locked in the restraining position A1 restrains the striker S, hence, the hood having the striker S fixed thereto is locked in the closed state.

Figure 5B:
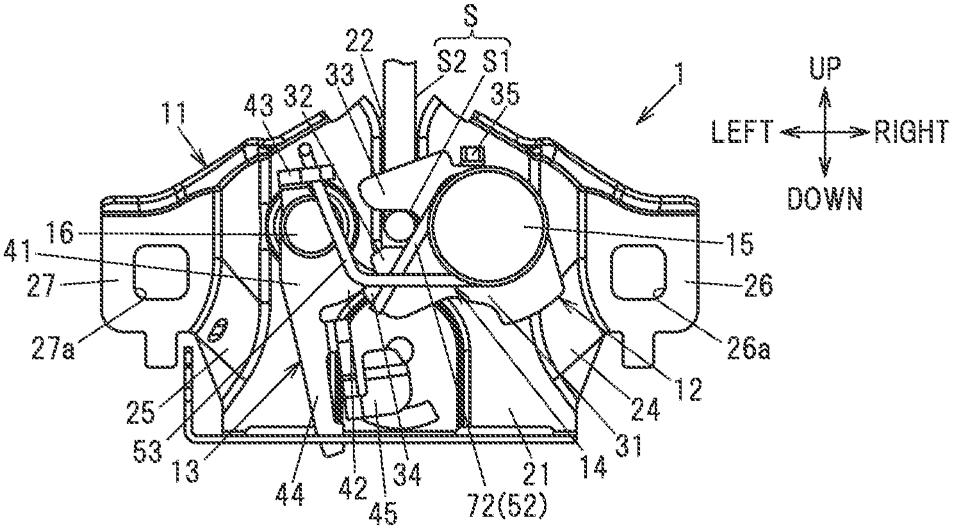

After that, the first arm portion 52 of the torsion spring 14 presses the columnar engagement portion S1 of the striker S against the second claw portion 33 of the latch 12, as shown in FIG. 5B. In this way, the torsion spring 14 acts as a buffer that presses the striker S against the second claw portion 33. The hood closing operation is thereby completed.

Next, the hood opening operation of the vehicle lock device 1 will be described in reference to FIGS. 6A-6C. This hood opening operation is performed by a user operating the operation portion 45 with the release cable and is an operation to push up the striker S by the vehicle lock device 1 and push open the hood. The hood opening operation is started in the state shown in FIG. 5B in which the latch 12 is locked in the restraining position A1 by the locking lever 13 and the latch 12 locked in the restraining position A1 restrains the striker S.

Figure 6A:
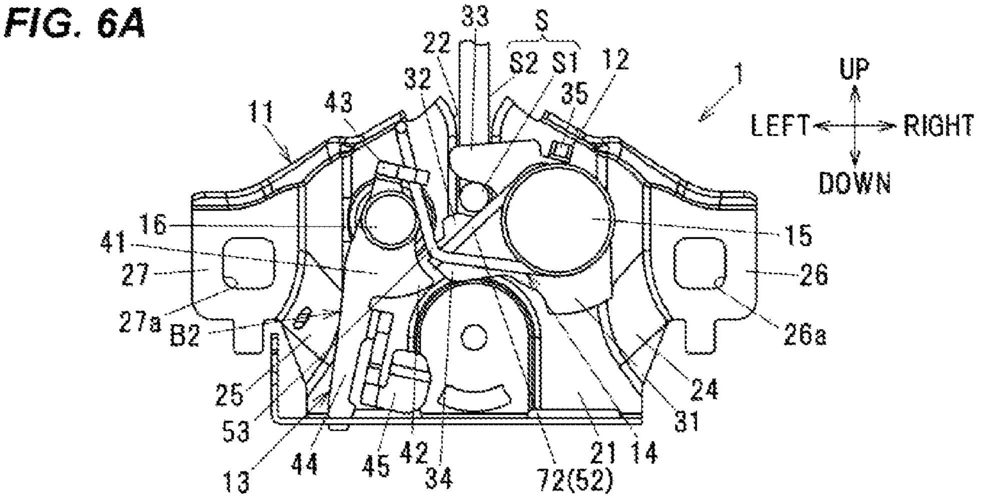
FIGS. 6A-6C are explanatory diagrams showing a hood opening operation of the vehicle lock device.

When the user operates the operation portion 45 by using the release cable, the locking lever 13 pivots from the lock position B1 to the unlock position B2 as shown in FIG. 6A and unlocks the latch 12. When the latch 12 is unlocked, the striker S is pushed upward by the first arm portion 52 due to the pressing force of the torsion spring 14, and the latch 12 of which second claw portion 33 is in contact with the columnar engagement portion S1 of the striker S pivots toward the release position A2.

Figure 6B:
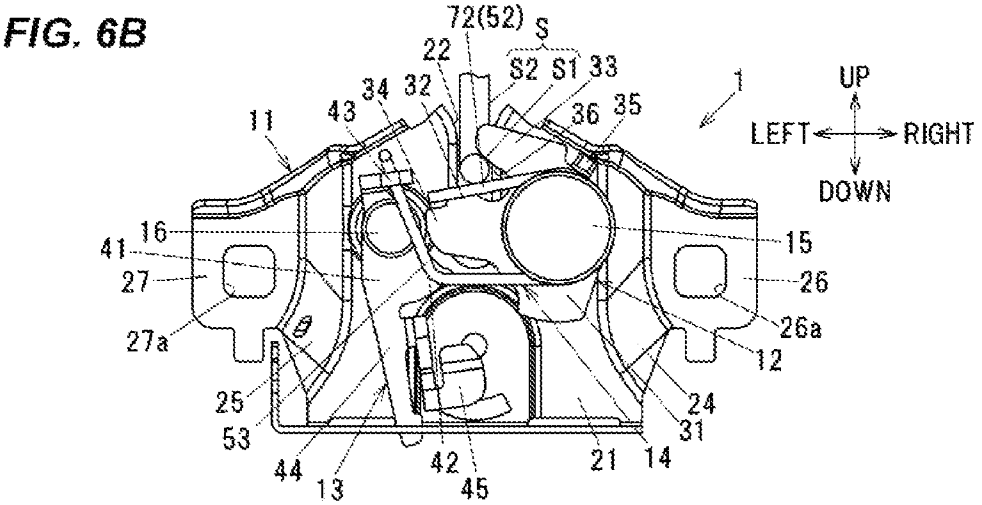
Figure 6C:
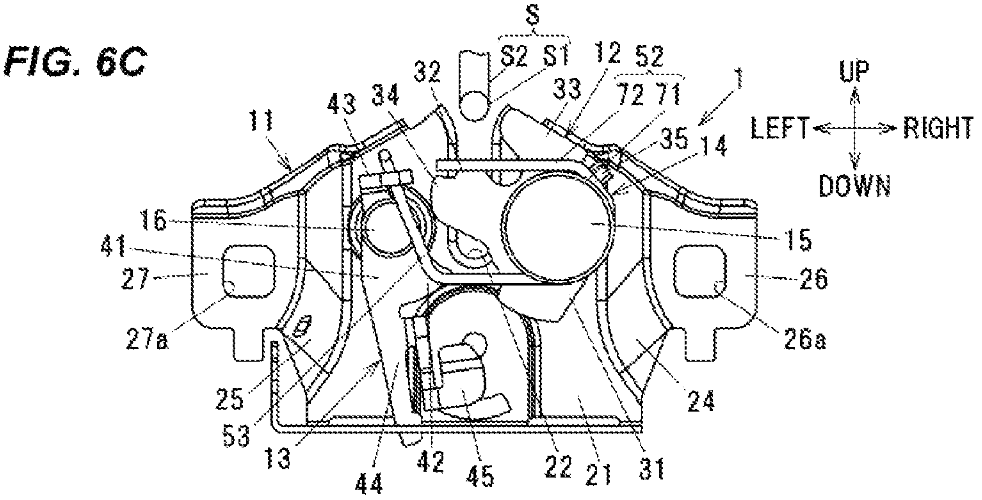

Then, after the latch 12 pivots due to pushing up of the striker S so that the restraining groove 36 faces upward as shown in FIG. 6B, the columnar engagement portion S1 of the striker S comes out of the restraining groove 36. Once the columnar engagement portion S1 of the striker S comes out of the restraining groove 36, the striker S is thrown up by the pressing force of the torsion spring 14 as shown in FIG. 6C and the hood is push opened.

At this time, the first arm portion 52 of the torsion spring 14 returns to the state before being pushed down, and (the latch engagement portion 71 of) the first arm portion 52 engages the engagement target rib 35 of the latch 12. Due to this engagement, the latch 12 is pressed toward the release position A2 by the pressing force of the torsion spring 14 and the position of the latch 12 is kept in the release position A2. The hood opening operation is thereby completed.

(Functions and Effects of the Embodiment)

In the configuration of the embodiment described above, since the torsion spring 14 having the first arm portion 52 coming into contact with the striker S and engaging the latch 12 is provided and the latch 12 is disengaged from the torsion spring 14 when the first arm portion 52 is pushed down by the striker S, the latch 12 does not engage the torsion spring 14 when pushing up the hood by the torsion spring 14 via the striker S or when pushing down the hood against the torsion spring 14. Therefore, sliding resistance is not generated at an engagement portion between the latch 12 and the torsion spring 14 at the time of pushing up and pushing down the hood, and it is thereby possible to suppress loss of force of pushing up and pushing down the hood. As a result, it is possible to reduce a force required to push up the hood (at the time of opening the hood) and a force required to push down the hood (at the time of closing the hood). Particularly, reducing the force required to push up the hood allows a small torsion spring 14 with a smaller spring force (elastic force, spring constant) to be selected. It is thereby possible to reduce the weight, size and cost of the vehicle lock device 1.

In addition, in the configuration of the embodiment described above, since one torsion spring 14 pushes up the hood via the striker S and also presses the latch 12 to rotate to the release position A2, it is possible to reduce the number of components of the vehicle lock device 1 which thus can have a simple structure. In the embodiment described above, the torsion spring 14 also acts as a buffer which presses the striker against the second claw portion 33 and prevents rattle noise during when the striker S is restrained. Therefore, as compared to when a buffer is separately provided, it is possible to reduce the number of components of the vehicle lock device 1 which thus can have a simple structure.

In addition, in the configuration of the embodiment described above, a disengagement structure, in which the first arm portion 52 is disengaged from the latch 12 when the first arm portion 52 is pushed down by the striker S, can be realized with a simple configuration by having the engagement target portion (the engagement target rib 35) which comes into contact with and engages the first arm portion 52 at the rear side of the rotation direction of the first arm portion 52 when the striker S pushes down the first arm portion 52.

Other Embodiments

Although the embodiment of the invention has been described, the invention according to claims is not to be limited to the embodiment. Further, please note that not all combinations of the features described in the embodiment are necessary to solve the problem of the invention. The invention can be appropriately modified and implemented without departing from the gist thereof.

Figure 7A:
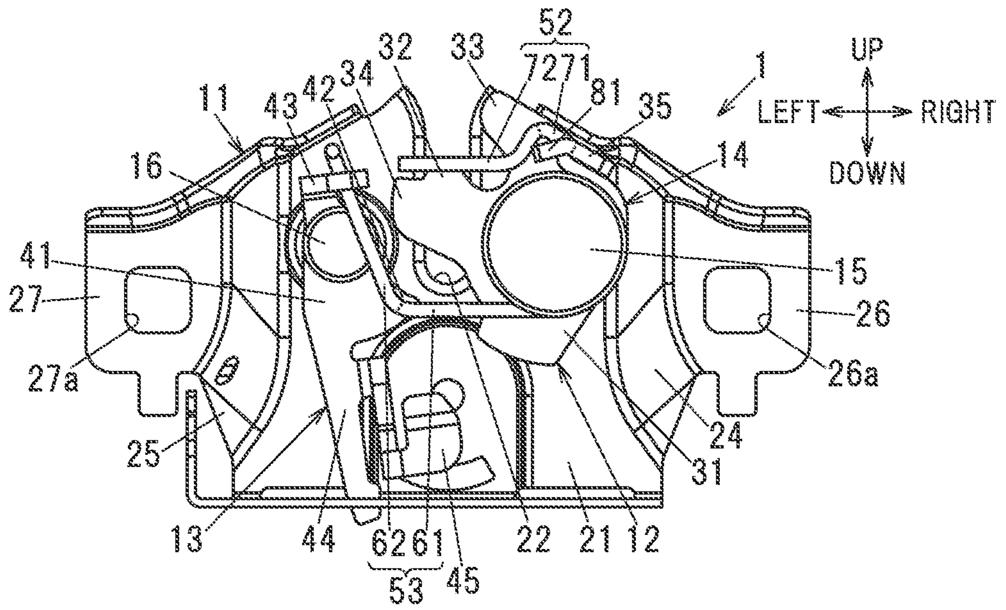
FIG. 7A is a front view showing a first modification of the vehicle lock device.
Figure 7B:
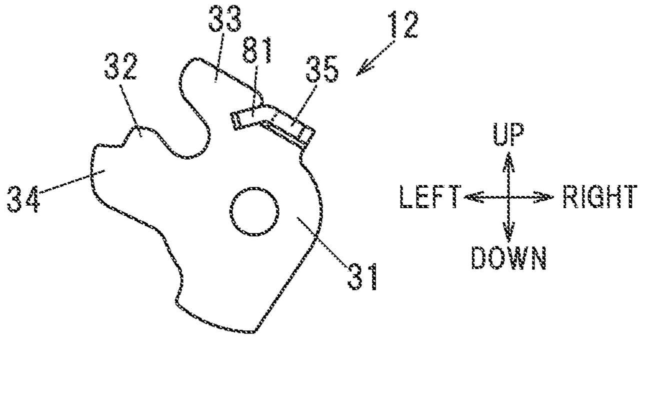
FIG. 7B is a front view showing the latch in the first modification.
Figure 7C:
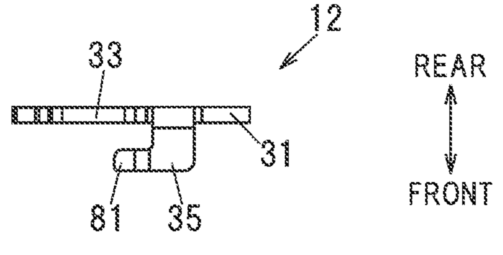
FIG. 7C is a side view showing the latch in the first modification when viewed from top right.

For example, although the engagement target rib 35 comes into contact with the first arm portion 52 in the radial direction of the coiled portion 51 in the configuration of the embodiment described above, it is not limited thereto as long as it is configured to contact at the rear side of the rotation direction of the first arm portion 52 when the striker S pushes down the first arm portion 52. That is, as shown in FIGS. 7A-7C, the configuration may be such that a portion of (the latch engagement portion 71) of the first arm portion 52 is extended in the radial direction of the coiled portion 51 so that the engagement target rib 35 comes into contact with such a portion in the circumferential direction of the coiled portion 51. In such a case, a left extension portion 81 extending in the left direction from an end portion of the engagement target rib 35 is preferably formed, as shown in FIGS. 7A-7C.

Figure 8A:
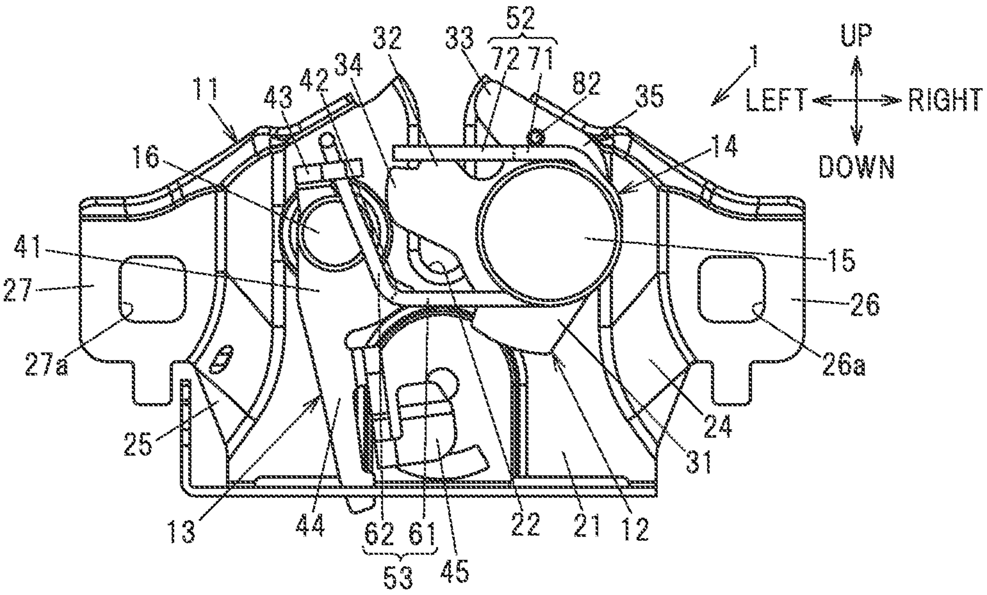
FIG. 8A is a front view showing a second modification of the vehicle lock device.
Figure 8B:
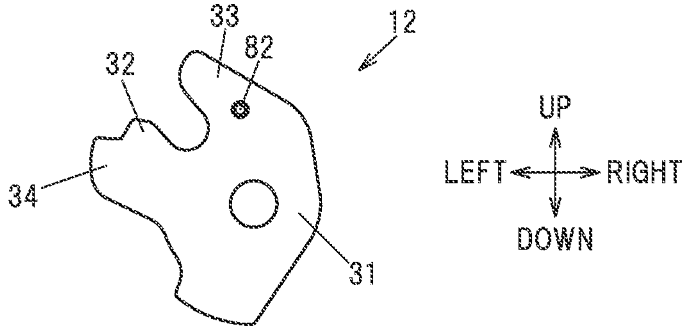
FIG. 8B is a front view showing the latch in the second modification.
Figure 8C:
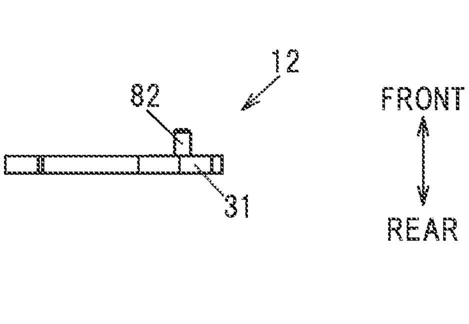
FIG. 8C is a side view showing the latch in the second modification when viewed from bottom right.

In addition, although the engagement target portion of the latch 12 to be engaged with the first arm portion 52 of the torsion spring 14 is composed of a rib (the engagement target rib 35) in the embodiment described above, it is not limited thereto. Such an engagement target portion may be composed of, e.g., an engagement target protrusion 82 which is a protrusion, such as a pin, formed on the main body 31 of the latch 12, as shown in FIGS. 8A-8C.

Figure 9A:
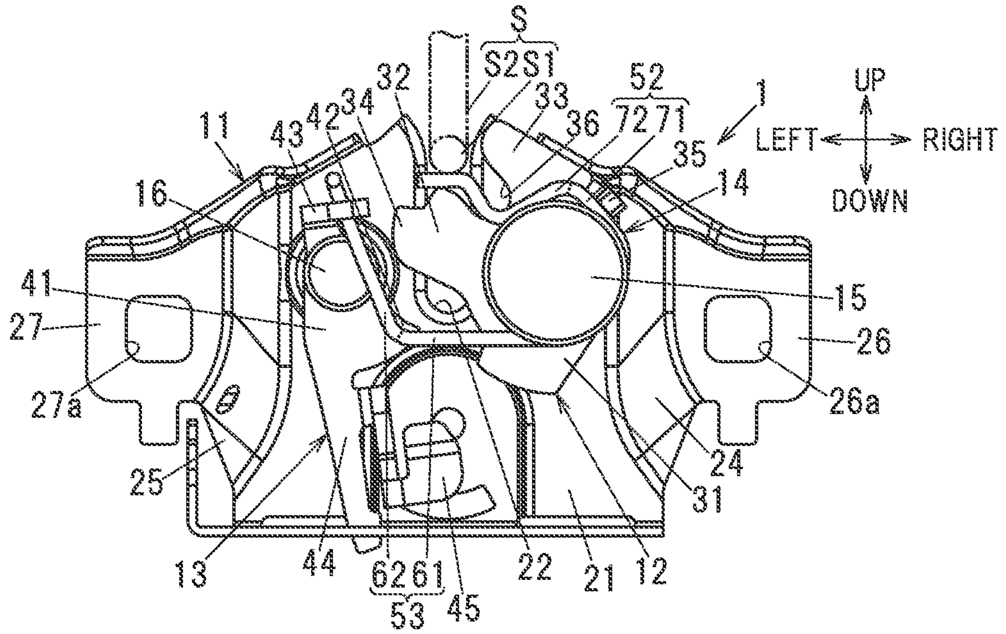
FIG. 9A is a front view showing a third modification of the vehicle lock device when the hood is in the open state.
Figure 9B:
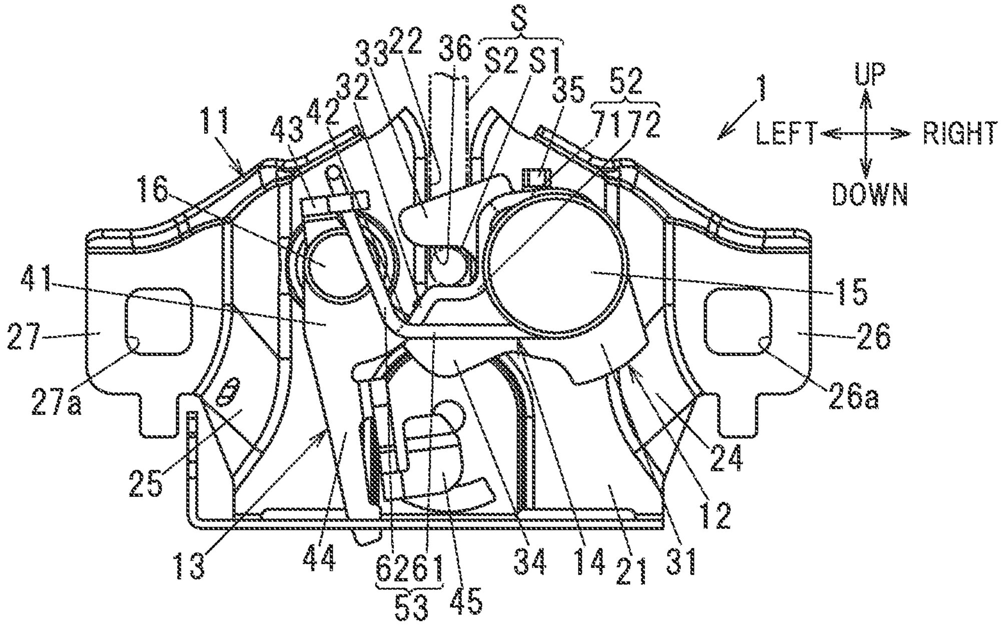
FIG. 9B is a front view when the hood is in the closed state.

In addition, although the striker contact portion 72 is formed straight (linear) in the embodiment described above, it is not limited thereto. That is, the striker contact portion 72 may be curved. For example, as shown in FIGS. 9A-9B, the first arm portion 52 may be bent (or curved) so that a normal direction at a position to be contacted by the striker S coincides with the entry direction D of the striker S in the state in which the striker S pushes down the first arm portion 52 and in the state in which the striker S does not push down the first arm portion 52. In such a configuration, since splitting of the force in the left-and-right direction does not occur between the striker S and the first arm portion 52 when pushing up or pushing down the hood, it is possible to further suppress loss of force of pushing up and pushing down the hood. In this regard, although the example shown in FIGS. 9A-9B is configured such that the normal direction at the position to be contacted by the striker S coincides with the entry direction D of the striker S in the two states shown in FIG. 9A and FIG. 9B, the configuration may be such that the first arm portion 52 is curved so that the normal direction at the position to be contacted by the striker S coincides with the entry direction D of the striker S in every state during when the first arm portion 52 is being pushed down.

In addition, although the invention is applied to the vehicle lock device 1 used to lock the hood for engine compartment (the engine hood) in the closed state in the embodiment described above, it is not limited thereto, and the invention may be applied to a vehicle lock device used to lock a hood for trunk compartment (a trunk hood) in the closed state. Furthermore, the invention is applicable to any vehicle lock device as long as it locks a lid opening/closing an opening provided on a vehicle body in such a manner that the lid is locked in a closed state, and the invention may be applied to, e.g., a vehicle lock device used to lock a lid to open and close a charging port (so-called charging port lid) into the closed state thereof.

In addition, although the striker S is fixed on the hood (lid) side and the vehicle lock device 1 is fixed on the opening side in the configuration of the embodiment described above, the configuration may such that the vehicle lock device 1 is fixed on the hood (lid) side and the striker S is fixed on the opening side.

In addition, although the description is omitted in the embodiment described above, the vehicle lock device 1 may further includes a safety lever to stop the hood in such a manner that the hood, which is going to open, is stopped in a partially open state in which the hood is slightly opened. In such a case, the expressions about the hood, such as open, at the time of opening and the open state in the embodiment described above include partially open, at the time of partially opening and the partially open state of the hood.

REFERENCE SIGNS LIST

1 VEHICLE LOCK DEVICE
11 BASE
12 LATCH
13 LOCKING LEVER
14 TORSION SPRING
22 ENTRY GROOVE
35 ENGAGEMENT TARGET RIB
51 COILED PORTION
52 FIRST ARM PORTION
53 SECOND ARM PORTION
71 LATCH ENGAGEMENT PORTION
72 STRIKER CONTACT PORTION
A1 RESTRAINING POSITION
A2 RELEASE POSITION
B1 LOCK POSITION
B2 UNLOCK POSITION
D ENTRY DIRECTION
S STRIKER

The invention claimed is:

1. A vehicle lock device which is configured to lock, in closed state, a lid to open and close an opening of a vehicle, the vehicle lock device comprising:

a base comprising an entry groove for entry of a striker;

a latch that pivots between a restraining position to restrain the striker and a release position to release the striker and also to allow entry of the striker;

a locking lever engaging the latch and holding the latch in the restraining position; and a torsion spring having a first arm portion, a second arm portion and a coiled portion, the torsion spring being configured to press the striker rearward in an entry direction when the first arm portion comes into contact with the striker, and apply an elastic force to the latch toward the release position when the first arm portion engages the latch, wherein the first arm portion of the torsion spring is disengaged from the latch when the first arm portion is pushed down in the entry direction by the striker, wherein the first arm portion comprises a latch engagement portion and a striker contact portion, the latch engagement portion extending from the coiled portion of the torsion spring and engaging the latch, the latch engagement portion having a first end connected to the coiled portion and a second end opposite to the first end connected to the striker contact portion, the striker contact portion being configured to come into contact with the striker, and wherein the latch engagement portion of the torsion spring engages the latch and presses the latch to the release position in the state in which the first arm portion is not pushed down in the entry direction by the striker.

2. The vehicle lock device according to claim 1, wherein the locking lever pivots between a lock position to hold the latch in the restraining position and an unlock position to release the latch, and wherein the torsion spring comprises a second arm portion that engages the locking lever and presses the locking lever toward the lock position.

3. The vehicle lock device according to claim 1, wherein the latch comprises an engagement target portion that comes into contact with the first arm portion and engages the first arm portion at a rear side of a rotation direction of the first arm portion 52 when the striker pushes down the first arm portion.

* * * * *